(12) United States Patent
Ling et al.

(10) Patent No.: US 12,328,173 B2
(45) Date of Patent: Jun. 10, 2025

(54) METHOD AND APPARATUS FOR TRANSMITTING SCELL BEAM FAILURE RECOVERY REQUESTS

(71) Applicant: Lenovo (Beijing) Limited, Beijing (CN)

(72) Inventors: Wei Ling, Changping (CN); Chenxi Zhu, Haidian District (CN); Bingchao Liu, Changping District (CN); Lingling Xiao, Haidian District (CN)

(73) Assignee: Lenovo (Beijing) Limited, Beijing (CN)

( * ) Notice: Subject to any disclaimer, the term of this patent is extended or adjusted under 35 U.S.C. 154(b) by 368 days.

(21) Appl. No.: 17/641,203

(22) PCT Filed: Sep. 25, 2019

(86) PCT No.: PCT/CN2019/107930
§ 371 (c)(1),
(2) Date: Mar. 8, 2022

(87) PCT Pub. No.: WO2021/056285
PCT Pub. Date: Apr. 1, 2021

(65) Prior Publication Data
US 2022/0416870 A1    Dec. 29, 2022

(51) Int. Cl.
| H04B 7/06 | (2006.01) |
| H04W 72/1268 | (2023.01) |
| H04W 76/19 | (2018.01) |

(52) U.S. Cl.
CPC ...... *H04B 7/0695* (2013.01); *H04W 72/1268* (2013.01); *H04W 76/19* (2018.02)

(58) Field of Classification Search
CPC . H04B 7/0695; H04W 76/19; H04W 72/1268
See application file for complete search history.

(56) References Cited

U.S. PATENT DOCUMENTS

| 9,559,951 B1* | 1/2017 | Sajassi .................. H04L 45/66 |
| 2019/0037498 A1 | 1/2019 | Tseng et al. |

(Continued)

FOREIGN PATENT DOCUMENTS

| CN | 110022613 A | 7/2019 |
| CN | 110120862 A | 8/2019 |
| CN | 110226340 A | 9/2019 |

OTHER PUBLICATIONS 19946938.8 , "Extended European Search Report", EP Application No. 19946938.8, Aug. 3, 2023, 18 pages.

(Continued)

*Primary Examiner* — Blake J Rubin
(74) *Attorney, Agent, or Firm* — FIG. 1 Patents (57) ABSTRACT

The present application is related to a method and apparatus for transmitting Scell beam failure recovery requests under 3GPP 5G New Radio (NR) technology. A method includes: in response to detection of a Scell beam failure, computing a time interval between the detection of the Scell beam failure and an available physical uplink shared channel (PUSCH) subsequent to the detection of the Scell beam failure; comparing the time interval with a time threshold; and determining whether to transmit at least one failed component carrier (CC) index associated with the detection of the Scell beam failure in the available PUSCH based on a result of comparing between the time interval and the time threshold.

20 Claims, 6 Drawing Sheets

(56) References Cited

U.S. PATENT DOCUMENTS

| | | | |
|---|---|---|---|
| 2019/0037604 A1 | 1/2019 | Akkarakaran et al. | |
| 2019/0190582 A1 | 6/2019 | Guo et al. | |
| 2021/0029719 A1* | 1/2021 | Zhou | H04L 5/0055 |
| 2021/0036757 A1* | 2/2021 | Yu | H04B 7/0626 |
| 2022/0104049 A1* | 3/2022 | Lee | H04B 7/0408 |
| 2022/0124777 A1* | 4/2022 | Kang | H04W 72/21 |
| 2022/0124784 A1* | 4/2022 | Kang | H04B 7/0695 |
| 2022/0132488 A1* | 4/2022 | Yang | H04W 72/56 |
| 2022/0224470 A1* | 7/2022 | Matsumura | H04B 7/0404 |
| 2024/0030995 A1* | 1/2024 | Zhang | H04W 52/281 |

OTHER PUBLICATIONS

Apple Inc. , "Feature lead summary on L1-SINR and SCell BFR", 3GPP TSG RAN WG1 #98, R1-1909482, Prague, Czech Republic [retrieved Sep. 20, 2023]. Retrieved from the Internet <https://www.3gpp.org/ftp/tsg_ran/WG1_RL1/TSGR1_98/Docs>, Aug. 2019, 24 pages.

NTT Docomo, Inc. , "Discussion on multi-beam enhancement", 3GPP TSG RAN WG1 #98, R1-1909202, Prague, CZ [retrieved Sep. 20, 2023]. Retrieved from the Internet <https://www.3gpp.org/ftp/tsg_ran/WG1_RL1/TSGR1_98/Docs?sortby=namerev>, Aug. 2019, 15 pages.

Samsung , "Enhancements on MIMO for NR", 3GPP TSG RAN meeting #85, RP-192270, Newport Beach, USA [retrieved Sep. 20, 2023]. Retrieved from the Internet <https://www.3gpp.org/ftp/tsg_ran/TSG_RAN/TSGR_85/Docs>, Sep. 2019, 13 pages.

"International Preliminary Report on Patentability", PCT Application No. PCT/CN2019/107930, Apr. 7, 2022, 6 pages.

"International Search Report and Written Opinion", PCT Application No. PCT/CN2019/107930, Jun. 23, 2020, 8 pages.

Apple Inc. , "Feature lead summary #2 on L1-SINR and SCell BFR", 3GPP TSG RAN WG1 #98, R1-1909743, Prague, Czech Republic, Aug. 2019, 24 pages.

Catt , "Discussion on out-of-order scheduling/HARQ", 3GPP TSG RAN WG1 Meeting #97, R1-1906330, Reno, NV, USA, May 2019, 9 pages.

Lenovo , et al., "Discussion of multi-beam operation", 3GPP TSG RAN WG1 Meeting #97, R1-1908721, Reno, NV, USA, May 2019, 9 pages.

LG Electronics , "Discussion on multi-beam based operations and enhancements", 3GPP TSG RAN WG1 Meeting #98, R1-1908700, Prague, CZ, Aug. 2019, 13 pages.

Vivo , "Further discussion on Multi-Beam Operation", 3GPP TSG RAN WG1 #98, R1-1908167, Prague, CZ, Aug. 2019, 12 pages.

Zte , "Enhancements on multi-beam operation", 3GPP TSG RAN WG1 Meeting #98, R1-1908192, Prague, CZ, Aug. 2019, 26 pages.

Zte , et al., "Remaining issues on short PUCCH", 3GPP TSG RAN WG1 Meeting #92b, R1-1803794, Sanya, China, Apr. 2018, 15 pages.

"Foreign Office Action", CN Application No. 201980100096.X, Feb. 19, 2025, 23 pages.

* cited by examiner

MATH AND APPARATUS FOR TRANSMITTING SCELL BEAM FAILURE RECOVERY REQUESTS

TECHNICAL FIELD

Embodiments of the present disclosure generally relate to wireless communication technology, especially to a method and an apparatus for transmitting beam failure recovery requests (BFRQs) for secondary cells (Scells).

BACKGROUND

Enhancements on Multiple-Input Multiple-Output (MIMO) for 5G new radio (NR) have been discussed in RP-181453 in 3rd generation partnership project (3GPP). The work item aims to specify the enhancements identified for NR MIMO. However, in 3GPP Release 16, when a user equipment (UE) detects at least one Scell beam failure, details of a Scell BFRQ transmitting procedure have not been discussed in 5G NR technology yet.

SUMMARY

Some embodiments of the present application provide a method. The method includes: in response to detection of a Scell beam failure, computing a time interval between the detection of the Scell beam failure and an available physical uplink shared channel (PUSCH) subsequent to the detection of the Scell beam failure; comparing the time interval with a time threshold; and determining whether to transmit at least one failed component carrier (CC) index associated with the detection of the Scell beam failure in the available PUSCH based on a result of comparing between the time interval and the time threshold.

Some embodiments of the present application provide an apparatus for wireless communications. The apparatus includes: a non-transitory computer-readable medium having stored thereon computer-executable instructions, a receiving circuitry; a transmitting circuitry; and a processor coupled to the non-transitory computer-readable medium, the receiving circuitry and the transmitting circuitry, wherein the computer-executable instructions cause the processor to implement the abovementioned method for transmitting at least one failed CC index.

Some embodiments of the present application provide a method. The method includes: determining whether a physical uplink control channel (PUCCH) configured for transmitting Scell BFRQ state information is overlapped with another PUCCH in time domain or not; and in response to the PUCCH configured for transmitting S cell BFRQ state information being overlapped with the abovementioned another PUCCH, transmitting the Scell BFRQ state information in the abovementioned another PUCCH.

Some embodiments of the present application provide an apparatus for wireless communications. The apparatus includes: a non-transitory computer-readable medium having stored thereon computer-executable instructions, a receiving circuitry; a transmitting circuitry; and a processor coupled to the non-transitory computer-readable medium, the receiving circuitry and the transmitting circuitry, wherein the computer-executable instructions cause the processor to implement the abovementioned method for transmitting Scell BFRQ state information.

BRIEF DESCRIPTION OF THE DRAWINGS

In order to describe the manner in which advantages and features of the application can be obtained, a description of the application is rendered by reference to specific embodiments thereof, which are illustrated in the appended drawings. These drawings depict only example embodiments of the application and are not therefore to be considered limiting of its scope.

DETAILED DESCRIPTION

The detailed description of the appended drawings is intended as a description of preferred embodiments of the present application and is not intended to represent the only form in which the present application may be practiced. It should be understood that the same or equivalent functions may be accomplished by different embodiments that are intended to be encompassed within the spirit and scope of the present application.

Reference will now be made in detail to some embodiments of the present application, examples of which are illustrated in the accompanying drawings. To facilitate understanding, embodiments are provided under specific network architecture and new service scenarios, such as 3GPP 5G, 3GPP LTE Release 8 and so on. It is contemplated that along with developments of network architectures and new service scenarios, all embodiments in the present application are also applicable to similar technical problems; and moreover, the terminologies recited in the present application may change, which should not affect the principle of the present application.

Figure 1:
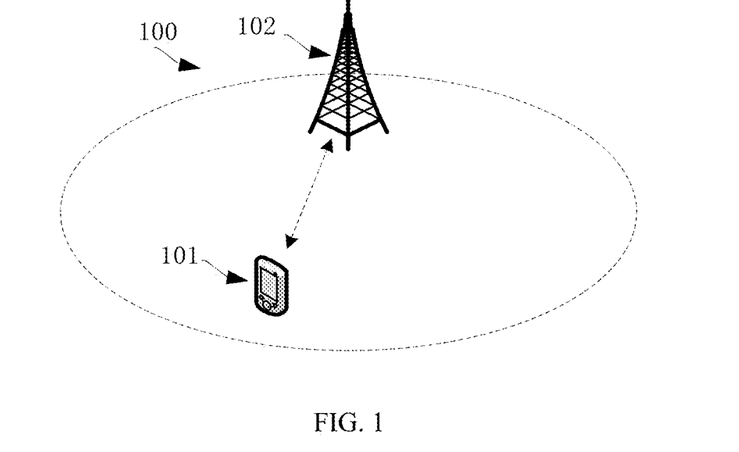
FIG. 1 illustrates a schematic diagram of an exemplary wireless communication system 100 in accordance with some embodiments of the present application.

FIG. 1 illustrates a schematic diagram of an exemplary wireless communication system 100 in accordance with some embodiments of the present application.

As illustrated and shown in FIG. 1, a wireless communication system 100 includes at least one user equipment (UE) 101 and at least one base station (BS) 102. In particular, the wireless communication system 100 includes only one UE 101 and one BS 102 for illustrative purpose. Although a specific number of UEs 101 and BSs 102 are depicted in FIG. 1, it is contemplated that any number of UEs 101 and BSs 102 may be included in the wireless communication system 100.

The UE(s) 101 may include computing devices, such as desktop computers, laptop computers, personal digital assistants (PDAs), tablet computers, smart televisions (e.g., televisions connected to the Internet), set-top boxes, game consoles, security systems (including security cameras), vehicle on-board computers, network devices (e.g., routers, switches, and modems), internet of things (IoT) devices, or the like. According to some embodiments of the present application, the UE(s) 101 may include a portable wireless communication device, a smart phone, a cellular telephone, a flip phone, a device having a subscriber identity module, a personal computer, a selective call receiver, or any other device that is capable of sending and receiving communication signals on a wireless network. In some embodiments of the present application, the UE(s) 101 includes wearable devices, such as smart watches, fitness bands, optical head-mounted displays, or the like. Moreover, the UE(s) 101 may be referred to as a subscriber unit, a mobile, a mobile station, a user, a terminal, a mobile terminal, a wireless terminal, a fixed terminal, a subscriber station, a user terminal, or a device, or described using other terminology used in the art. The UE(s) 101 may communicate directly with BSs 102 via uplink (UL) communication signals.

In some embodiments of the present application, each of the UE(s) 101 may be deployed an IoT application, an eMBB application and/or an URLLC application. It is contemplated that the specific type of application(s) deployed in the UE(s) 101 may be varied and not limited.

The BS(s) 102 may be distributed over a geographic region. In certain embodiments of the present application, each of the BS(s) 102 may also be referred to as an access point, an access terminal, a base, a base unit, a macro cell, a Node-B, an evolved Node B (eNB), a gNB, a NG-RAN (Next Generation-Radio Access Network) node, a Home Node-B, a relay node, or a device, or described using other terminology used in the art. The BS(s) 102 is generally a part of a radio access network that may include one or more controllers communicably coupled to one or more corresponding BS(s) 102. BS(s) 102 may communicate directly with each other.

The wireless communication system 100 may be compatible with any type of network that is capable of sending and receiving wireless communication signals. For example, the wireless communication system 100 is compatible with a wireless communication network, a cellular telephone network, a Time Division Multiple Access (TDMA)-based network, a Code Division Multiple Access (CDMA)-based network, an Orthogonal Frequency Division Multiple Access (OFDMA)-based network, an LTE network, a 3GPP-based network, a 3GPP 5G network, a satellite communications network, a high altitude platform network, and/or other communications networks.

In some embodiments of the present application, the wireless communication system 100 is compatible with the 5G NR of the 3GPP protocol, wherein BS(s) 102 transmit data using an OFDM modulation scheme on the DL and the UE(s) 101 transmit data on the UL using a single-carrier frequency division multiple access (SC-FDMA) or OFDM scheme. More generally, however, the wireless communication system 100 may implement some other open or proprietary communication protocols, for example, WiMAX, among other protocols.

In some embodiments of the present application, the BS(s) 102 may communicate using other communication protocols, such as the IEEE 802.11 family of wireless communication protocols. Further, in some embodiments of the present application, the BS(s) 102 may communicate over licensed spectrums, whereas in other embodiments, the BS(s) 102 may communicate over unlicensed spectrums. The present application is not intended to be limited to the implementation of any particular wireless communication system architecture or protocol. In yet some embodiments of present application, the BS(s) 102 may communicate with the UE(s) 101 using the 3GPP 5G protocols.

In 3GPP 5G NR technology, when a UE detects one or more Scell beam failures, the UE needs to transmit a BFRQ associated with the Scell beam failures to a BS. As defined in 3GPP TS38.213, a UE may be configured with a set of resource(s) named as failure detection resources for a Scell, and the UE detects a Scell beam failure only if the UE detects that a radio link quality of all resource(s) in the set of resource(s) is worse than a threshold. Moreover, as agreed in NR Release 16, a UE sends an indication of a detected Scell beam failure in one step, and sends the failed CC index corresponding to the detected Scell beam failure and an available beam index corresponding to the failed CC index in a MAC CE in another step. Currently, in some solutions under 5G NR, a BFRQ associated with one or more Scell beam failures is carried by one or more dedicated PUCCH resources over a primary cell (PCell) or a primary secondary cell (PScell). However, problems concern how to notify a BS that at least one Scell requests a Scell beam failure recovery (BFR), how to multiplex a Scell BFRQ state information with other uplink (UL) transmission, and when a BFRQ can be transmitted on a PUSCH without a Scell BFRQ PUCCH need to be solved. A Scell BFRQ PUCCH is a PUCCH configured for transmitting Scell BFRQ state information associated with a detection of a Scell beam failure. In some embodiments of the present application, a Scell BFRQ PUCCH can also be expressed as a PUCCH for Scell beam failure(s).

Figure 2:
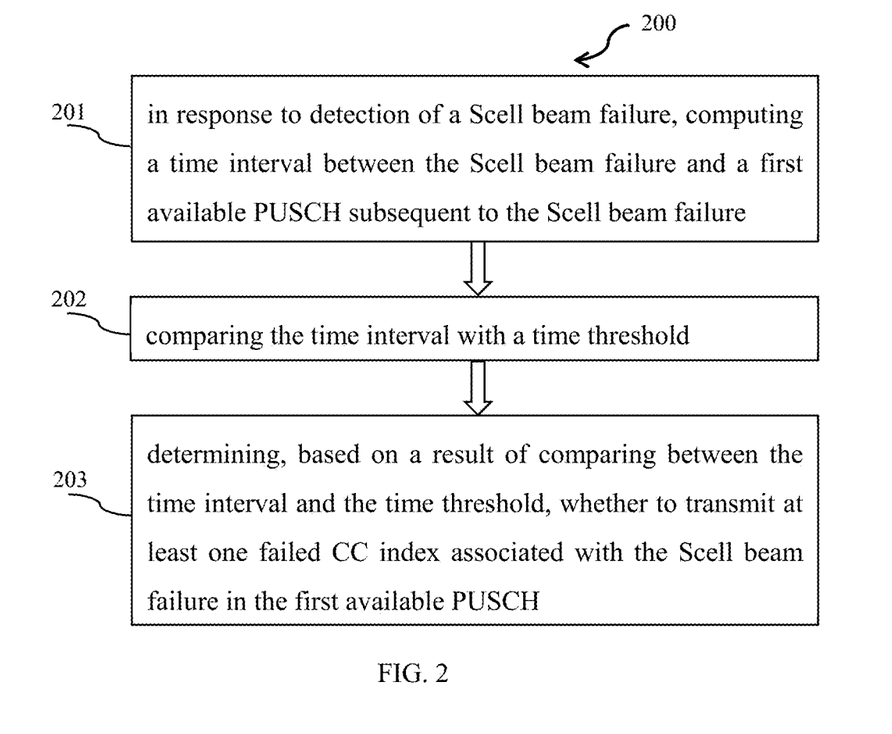
FIG. 2 illustrates a flow chart of a method 200 for wireless communication in accordance with some embodiments of the present application.

FIG. 2 illustrates a flow chart of a method 200 for wireless communication in accordance with some embodiments of the present application.

In the exemplary method 200 as illustrated and shown in FIG. 2, in step 201, a UE (e.g., a UE 101 as illustrated and shown in FIG. 1) computes a time interval between a Scell beam failure and a first available PUSCH subsequent to the Scell beam failure, in response to the detection of the Scell beam failure. The first available PUSCH subsequent to the Scell beam failure represents a PUSCH which is scheduled by UL downlink control information (DCI) transmitted by the UE or configured by a higher layer and firstly transmitted after the Scell beam failure. The first available PUSCH is not a PUSCH for retransmission, because the PUSCH for retransmission can only transmit the same data with the original transmission.

In some embodiments of the present application, in step 201 in the exemplary method 200, the UE computes a time interval between the Scell beam failure and the first available PUSCH subsequent to the Scell beam failure, e.g., an end time of the Scell beam failure and a starting time of the first available PUSCH subsequent to the Scell beam failure. For example, in the exemplary method 200, after detecting one or more Scell beam failures, the UE computes a time interval between the end time of the final Scell beam failure of all Scell beam failures and the starting time of the first available PUSCH subsequent to all the Scell beam failures.

In step 202, the UE compares the time interval computed in step 201 with a time threshold, to determine whether the time interval is greater than, equal to, or less than the time threshold.

In some embodiments of the present application, the time threshold means a minimum time between the UE detecting the Scell beam failure and a PUSCH on which Scell BFRQ can be multiplexed. The time threshold is associated with a process capability of the UE. The time threshold may be configured by radio resource control (RRC) signalling or predefined. The time threshold (e.g., "threshold" as illustrated and shown in FIGS. 3-6 of the present application) may be named as a "t_threshold" in some embodiments of the present application.

In step 203, the UE determines, based on a result of comparing between the time interval and the time threshold, whether to transmit at least one failed CC index associated with the Scell beam failure in the first available PUSCH.

In some embodiments of the present application, Scell BFRQ state information associated with one or more Scell beam failures is carried by one or more dedicated PUCCH resources for a BFRQ. Scell BFRQ state information associated with one or more Scell beam failures may also be named as "BFRQ state information" in some embodiments of the present application. In accordance with some embodiments of the present application, the Scell BFRQ state information can be transmitted in a scheduling request (SR)-like manner. In accordance with some embodiments of the present application, Scell BFRQ state information may have a higher priority than an SR.

In some embodiments of the present application, Scell BFRQ state information associated with one or more Scell beam failures includes a positive Scell BFRQ, and the positive Scell BFRQ represents requesting an uplink resource to transmit at least one failed component carrier (CC) index associated with the one or more Scell beam failures. In some other embodiments of the present application, Scell BFRQ state information associated with one or more Scell beam failures includes a negative Scell BFRQ, and the negative Scell BFRQ represents not requesting an uplink resource to transmit the at least one failed CC index.

In some embodiments of the present application, a UE transmits Scell BFRQ state information by rate matching the S cell BFRQ state information and data in a PUSCH. In some other embodiments of the present application, a UE transmits Scell BFRQ state information by puncturing the Scell BFRQ state information in a PUSCH.

In some embodiments of the present application, a BFRQ associated with one Scell beam failure includes one failed CC index associated with the Scell beam failure. In the case that multiple Scell beam failures are detected by a UE, a BFRQ associated with these Scell beam failures includes more than one failed CC indexes associated with these Scell beam failures. For example, a BFRQ associated with three Scell beam failures may include three failed CC indexes associated with the three Scell beam failures.

In some embodiments of the present application, a BFRQ associated with one or more Scell beam failures further includes at least one available beam index corresponding to at least one failed CC index. Accordingly, a UE transmits both the at least one failed CC index and the corresponding at least one available beam index to a BS (e.g., a BS 102 as illustrated and shown in FIG. 1).

In some embodiments of the present application, in step 203 in the exemplary method 200, in response to the time interval being equal to or greater than the time threshold, the UE transmits the at least one failed CC index in the first available PUSCH. In some embodiments of the present application, in step 203 in the exemplary method 200, in response to the time interval being less than the time threshold, the UE determines not to transmit the at least one failed CC index in the first available PUSCH.

In some embodiments of the present application, in step 203 in the exemplary method 200, the UE further determines whether to transmit at least one available beam index corresponding to the failed CC index in the first available PUSCH based on the result of comparing between the time interval and the time threshold.

In some embodiments of the present application, a BFRQ associated with a Scell beam failure is carried in a medium access control-control element (MAC-CE). For example, at least one failed CC index is carried in a MAC-CE. For a further example, besides the at least one failed CC index, at least one available beam index corresponding to the at least one failed CC index is also carried in a MAC-CE.

In some embodiments of the present application, when a UE finds out that a beam fails in at least one Scell and there is a PUSCH to be transmitted subsequent to a detection of the beam failure, the UE may transmit a Scell BFRQ in the PUSCH to indicate failed CC index(es) and the corresponding available beam index(es) if the time interval between the detection of the beam failure and the PUSCH is enough to perform this transmission of the Scell BFRQ.

Figure 3:
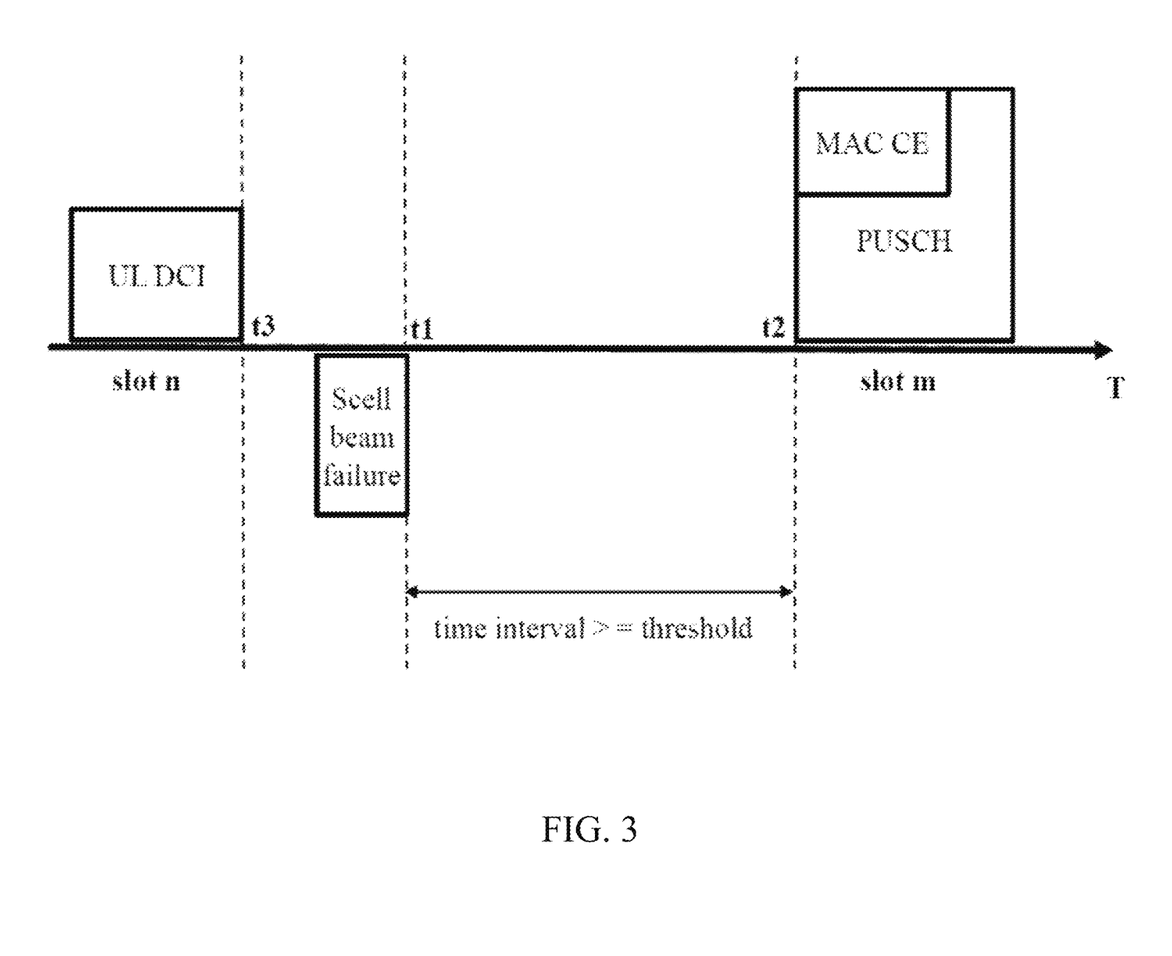
FIG. 3 illustrates an exemplary Scell BFRQ procedure in accordance with some embodiments of the present application.

FIG. 3 illustrates an exemplary Scell BFRQ procedure in accordance with some embodiments of the present application. The exemplary Scell BFRQ procedure as illustrated and shown in FIG. 3 is performed by a UE (e.g., a UE 101 as illustrated and shown in FIG. 1).

Specifically, as illustrated and shown in FIG. 3, a UE receives UL DCI in slot n and transmits a PUSCH in slot m in the time domain (i.e., "T" as illustrated and shown in FIG. 3), wherein the PUSCH transmitted in slot m is scheduled by the UL DCI in slot n. The UE will decode the UL DCI received in slot n and prepare data for the PUSCH transmission performed in slot m. Since the UE needs time to perform these processes, there is a time interval between the UL DCI in slot n and the PUSCH transmission in slot m starting from time "t2", i.e., a time interval between time "t3" and time "t2" as illustrated and shown in FIG. 3. If the UE detects at least one Scell beam failure in time "t1", the UE may know the failed CC index(es) and the corresponding available beam index(es) associated with the least one Scell beam failure. The UE may prepare a MAC CE so that the failed CC index(es) and/or the corresponding available beam index(es) can be reported to a BS (e.g., a BS 102 as illustrated and shown in FIG. 1). A MAC CE which indicates failed CC index(es) and/or the corresponding available beam index(es) to a BS may be named as a Scell BFRQ MAC CE.

When the UE knows that the first available PUSCH subsequent to the detection of the beam failure is to be transmitted in slot m, the UE may determine whether the MAC CE can be transmitted in the first available PUSCH.

According to some embodiments of the present application, one possible approach is determining whether there is enough time for the UE to transmit the Scell BFRQ MAC CE in the first available PUSCH. For example, the UE may compute a time interval between the end time of the Scell beam failure and a starting time of the first available PUSCH to be transmitted, i.e., a time interval between the time "t1" and the time "t2". The UE may determine whether the time is enough by comparing the time interval with a time threshold. As described above, since the UE needs both the time for preparing an Scell BFRQ MAC CE and the time for multiplexing the Scell BFRQ MAC CE on the PUSCH, the minimum time between the Scell beam failure being detected and multiplexing a Scell BFRQ MAC CE in the PUSCH is required. The time threshold can be the same or greater than the minimum time.

The time threshold is shown as "threshold" in FIG. 3. In accordance with the embodiment shown in FIG. 3, since the UE does not need to detect a UL DCI in t1, the time threshold is not greater than the time interval between the UL DCI and the first available PUSCH, e.g., a time interval between "t3" and "t2" as illustrated and shown in FIG. 3. Besides, the Scell BFRQ MAC CE can be multiplexed on the first available PUSCH only if the first available PUSCH have enough resource elements (REs) to carry the whole MAC CE.

In some embodiments of the present application, the UE does not transmit Scell BFRQ state information. The UE can directly transmit a Scell BFRQ MAC CE in a PUSCH, in the case that the PUSCH is not for retransmission and has enough REs to carry the whole MAC CE.

When all the above conditions satisfy with the requirement, e.g., the first available PUSCH includes enough REs to carry a Scell BFRQ MAC CE and the time interval is not less than the threshold (e.g., "time interval>=threshold" as illustrated and shown in FIG. 3), a UE will transmit the Scell BFRQ MAC CE in the first available PUSCH without transmitting Scell BFRQ state information. That is, the Scell BFRQ MAC CE is transmitted or multiplexed with other UL data on the first available PUSCH as illustrated and shown in FIG. 3.

According to the embodiments as illustrated and shown in FIG. 3, in the case that a Scell BFRQ MAC CE can be multiplexed in the first available PUSCH, the UE may not send a Scell BFRQ PUCCH. In particular, if the PUSCH is scheduled by a UL DCI ending at time "t3" and no new Scell beam failure is detected between time "t1" and "t2," the UE will not transmit a Scell BFRQ PUCCH between time "t1" and "t2" even if there is a PUCCH resource for Scell BFRQ state information configured by a BS (not shown in FIG. 3).

Figure 4:
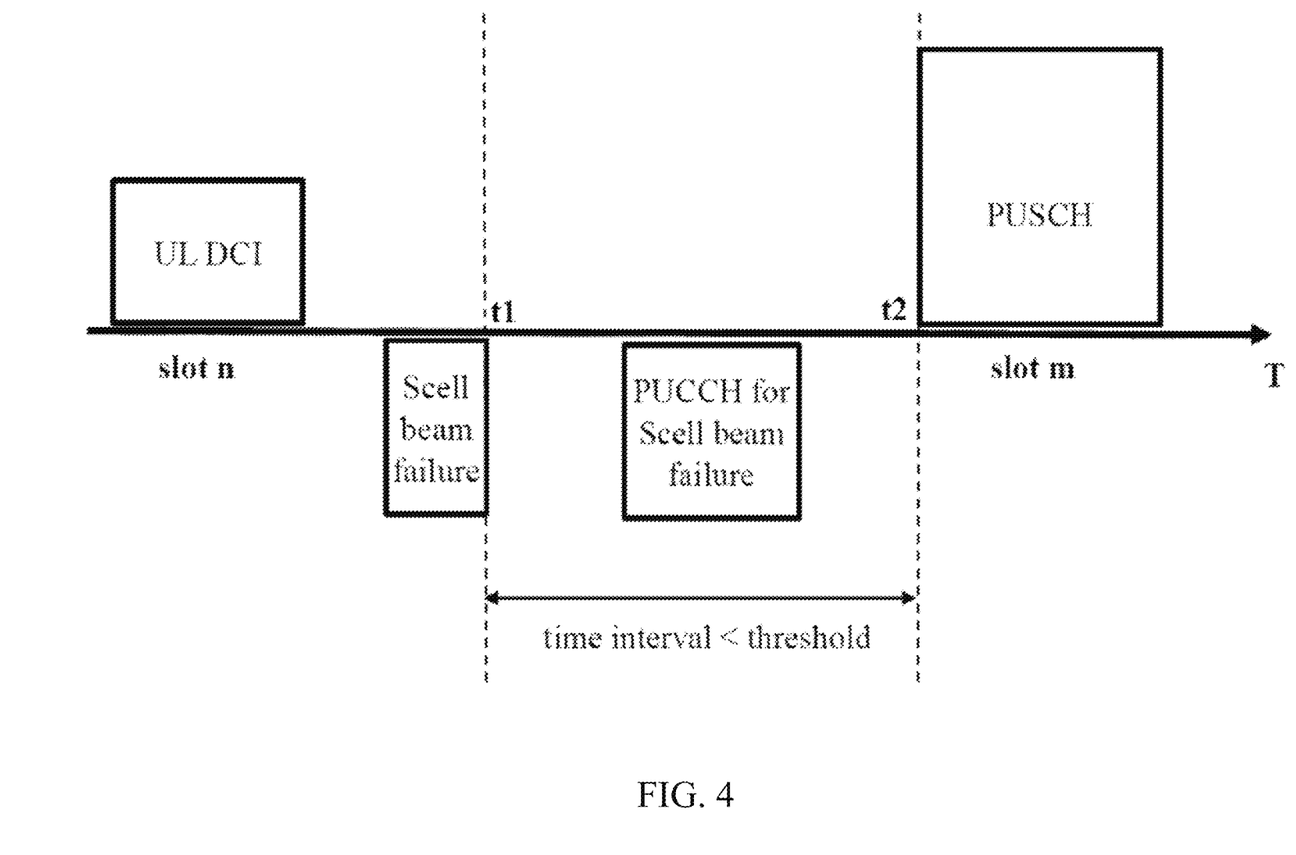
FIG. 4 illustrates an exemplary Scell BFRQ procedure in accordance with some embodiments of the present application.

FIG. 4 illustrates an exemplary Scell BFRQ procedure in accordance with some embodiments of the present application. Similar to FIG. 3, the exemplary Scell BFRQ procedure as illustrated and shown in FIG. 4 is performed by a UE (e.g., a UE 101 as illustrated and shown in FIG. 1).

In the embodiments of FIG. 4, steps and operations performed by the UE are similar to those in FIG. 3. Differences between the embodiments of FIGS. 3 and 4 include that in the embodiments of FIG. 4, the time interval between the detection of the Scell beam failure and the starting time of the first available PUSCH (i.e., "time interval" as illustrated and shown in FIG. 4) is less than the time threshold (i.e., "threshold" as illustrated and shown in FIG. 4). In this scenario, a Scell BFRQ MAC CE cannot be transmitted in the first available PUSCH due to a minimum time requirement for multiplexing a Scell BFRQ MAC CE in the PUSCH not being satisfied. Therefore, the UE may send a positive Scell BFRQ state in the slot configured for Scell BFRQ PUCCH resource after the time t2, or the UE may send the Scell BFRQ MAC CE if there is a PUSCH which satisfies the minimum time requirement for multiplexing the Scell BFRQ MAC CE in the PUSCH in a next slot subsequent to slot m as illustrated and shown in FIG. 4.

More specifically, as illustrated and shown in FIG. 4, if a minimum time requirement is not satisfied while a Scell BFRQ PUCCH is configured by a BS (e.g., a BS 102 as illustrated and shown in FIG. 1), the UE will transmit the Scell BFRQ PUCCH during the time interval between time "t1" and "t2".

In some embodiments of the present application, when uplink control information (UCI) is multiplexed on a PUSCH, SR state is not transmitted on the PUSCH. Although Scell BFRQ state information is similar to the SR, a multiplexing scheme of Scell BFRQ state information on a PUSCH may be different from the SR state in the case that S cell BFRQ state information has a higher priority than a SR.

As discussed in the embodiments of FIGS. 3 and 4, whether a Scell BFRQ MAC CE can be transmitted in a PUSCH without transmitting Scell BFRQ state information depends a time interval between the detection of the S cell beam failure and the PUSCH and the capacity of the PUSCH. As described above, a Scell BFRQ MAC CE can be transmitted in the PUSCH means that the time interval is not less than the time threshold and the PUSCH has enough available REs for carrying the Scell BFRQ MAC CE. In other words, there is no need for the UE to request a UL resource to transmit the Scell BFRQ MAC CE. In this case, if the Scell BFRQ PUCCH is overlapped with the PUSCH in time domain, the UE does not need to transmit the Scell BFRQ state information.

In addition, that the Scell BFRQ MAC CE cannot be transmitted in the PUSCH means the time interval is less than the time threshold or the capacity of PUSCH does not allow the Scell BFRQ MAC CE. Accordingly, the UE needs to request a UL resource to transmit the Scell BFRQ MAC CE. In this case, if the Scell BFRQ PUCCH is overlapped with the PUSCH, the UE needs to transmit the Scell BFRQ state information.

In a BS side, the BS has no information regarding whether there is a Scell BFRQ and whether a Scell BFRQ MAC CE can be transmitted on a PUSCH. Accordingly, the BS may always detect Scell BFRQ state information on the PUSCH if the Scell BFRQ PUCCH is overlapped with the PUSCH.

A UE may transmit Scell BFRQ state information on a PUSCH to report the BS whether a UL resource is required to transmit a Scell BFRQ MAC CE. Positive Scell BFRQ state information means that a UE needs a UL resource to transmit a Scell BFRQ MAC CE, while negative Scell BFRQ state information means that a UE does not need a UL resource to transmit a Scell BFRQ MAC CE.

In some embodiments of the present application, when an Scell BFRQ MAC CE cannot transmitted on a PUSCH and the PUSCH is overlapped with the Scell BFRQ PUCCH, a UE may transmit positive Scell BFRQ state information on the PUSCH to a BS, so as to report the BS that a UL resource is required to transmit the Scell BFRQ MAC CE.

In some embodiments of the present application, when an Scell BFRQ MAC CE is transmitted in a PUSCH and the PUSCH is overlapped with the Scell BFRQ PUCCH, a UE may transmit negative Scell BFRQ state information in the PUSCH to a BS, so as to report that no UL resource is required to transmit a Scell BFRQ MAC CE. In some other embodiments of the present application, when Scell BFRQ MAC CE is transmitted in a PUSCH and the PUSCH is overlapped with the Scell BFRQ PUCCH, a UE may not transmit Scell BFRQ state information to a BS, which also indicates that no UL resource is required to transmit a S cell BFRQ MAC CE.

Figure 5:
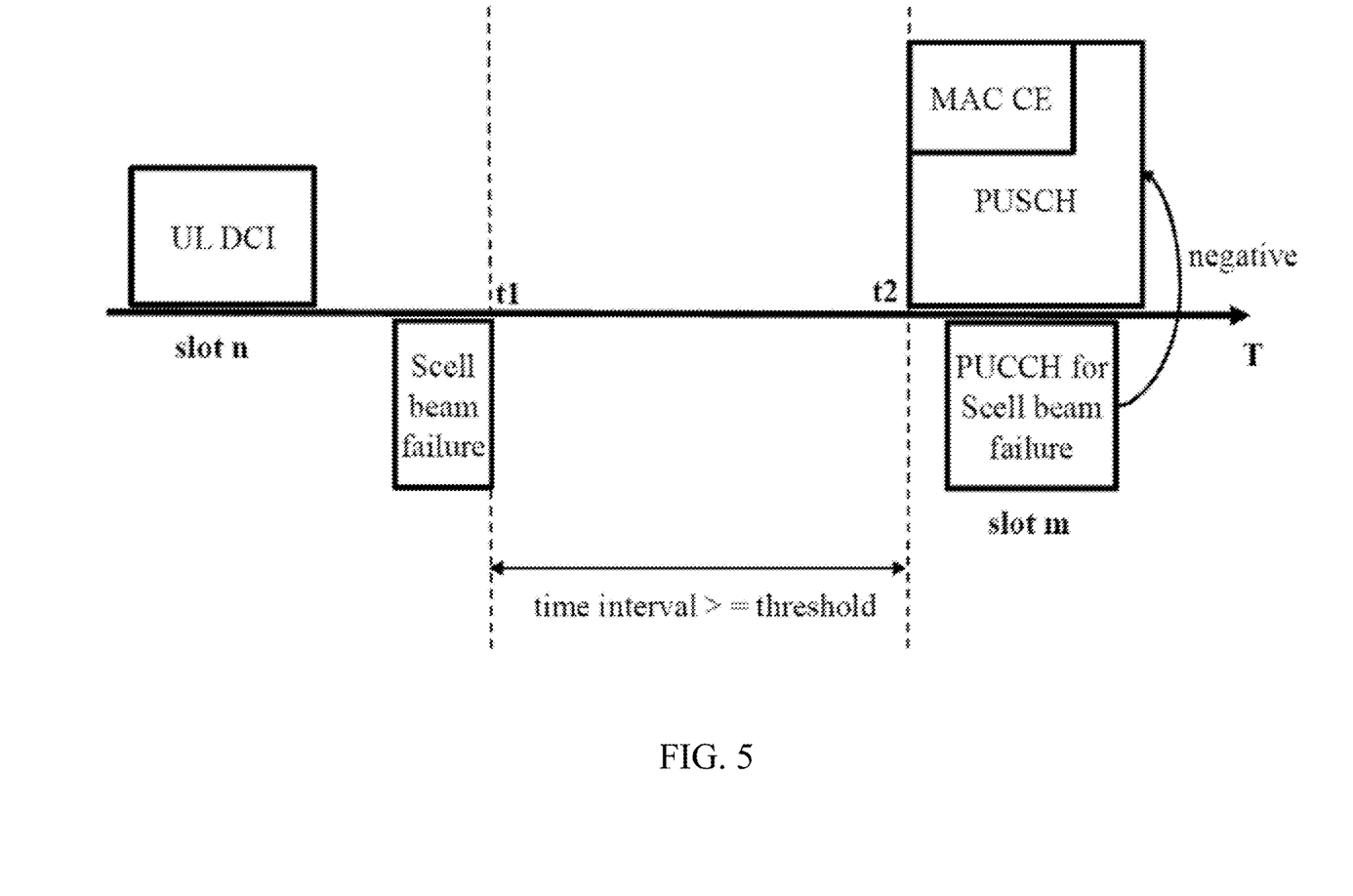
FIG. 5 illustrates a further exemplary Scell BFRQ procedure in accordance with some embodiments of the present application.

FIG. 5 illustrates a further exemplary Scell BFRQ procedure in accordance with some embodiments of the present application. Similar to FIGS. 3 and 4, the exemplary Scell BFRQ procedure as illustrated and shown in FIG. 5 is performed by a UE (e.g., a UE 101 as illustrated and shown in FIG. 1).

In the embodiments of FIG. 5, steps and operations performed by the UE are similar to those in FIG. 3. Similarities between the embodiments of FIGS. 3 and 5 include that UL DCI transmitted in slot n schedules a PUSCH transmitted in slot m for a UE, and a time interval between a detection of a Scell beam failure and a starting time of the PUSCH (i.e., "time interval" as illustrated and shown in FIG. 5) is not less than the time threshold (i.e., "threshold" as illustrated and shown in FIG. 5), and thus, the UE may transmit or multiplex a S cell BFRQ MAC CE in the PUSCH in slot m, due to satisfying a minimum time requirement of multiplexing the Scell BFRQ MAC CE in the PUSCH in slot m.

The differences between the embodiments of FIGS. 3 and 5 include that in the embodiments of FIG. 5, the PUSCH which is scheduled by UL DCI in slot n in time domain (i.e., "T" as illustrated and shown in FIG. 5) is transmitted in slot m, and a Scell BFRQ PUCCH is also transmitted in slot m. Besides, the Scell BFRQ PUCCH is overlapped with the PUSCH in time domain.

More specifically, in the embodiments of FIG. 5, if the UE detects a Scell beam failure in time point "t1", the UE will firstly determine whether the S cell BFRQ MAC CE can be transmitted in the PUSCH. Since the time interval between a detection of a Scell beam failure and a starting time of the PUSCH is not less than the time threshold, the UE may transmit the Scell BFRQ MAC CE in the PUSCH as illustrated and shown in FIG. 5. Hence, the UE does not need a UL resource to transmit the Scell BFRQ MAC CE.

In one example, as illustrated and shown in FIG. 5, the UE may transmit negative Scell BFRQ state information in the PUSCH to a BS (e.g., a BS 102 as illustrated and shown in FIG. 1), so as to indicate that no UL resource is required to transmit a Scell BFRQ MAC CE. In another example, the UE may not transmit Scell BFRQ state information in the PUSCH, which also indicates that no UL resource is required to transmit a Scell BFRQ MAC CE.

Figure 6:
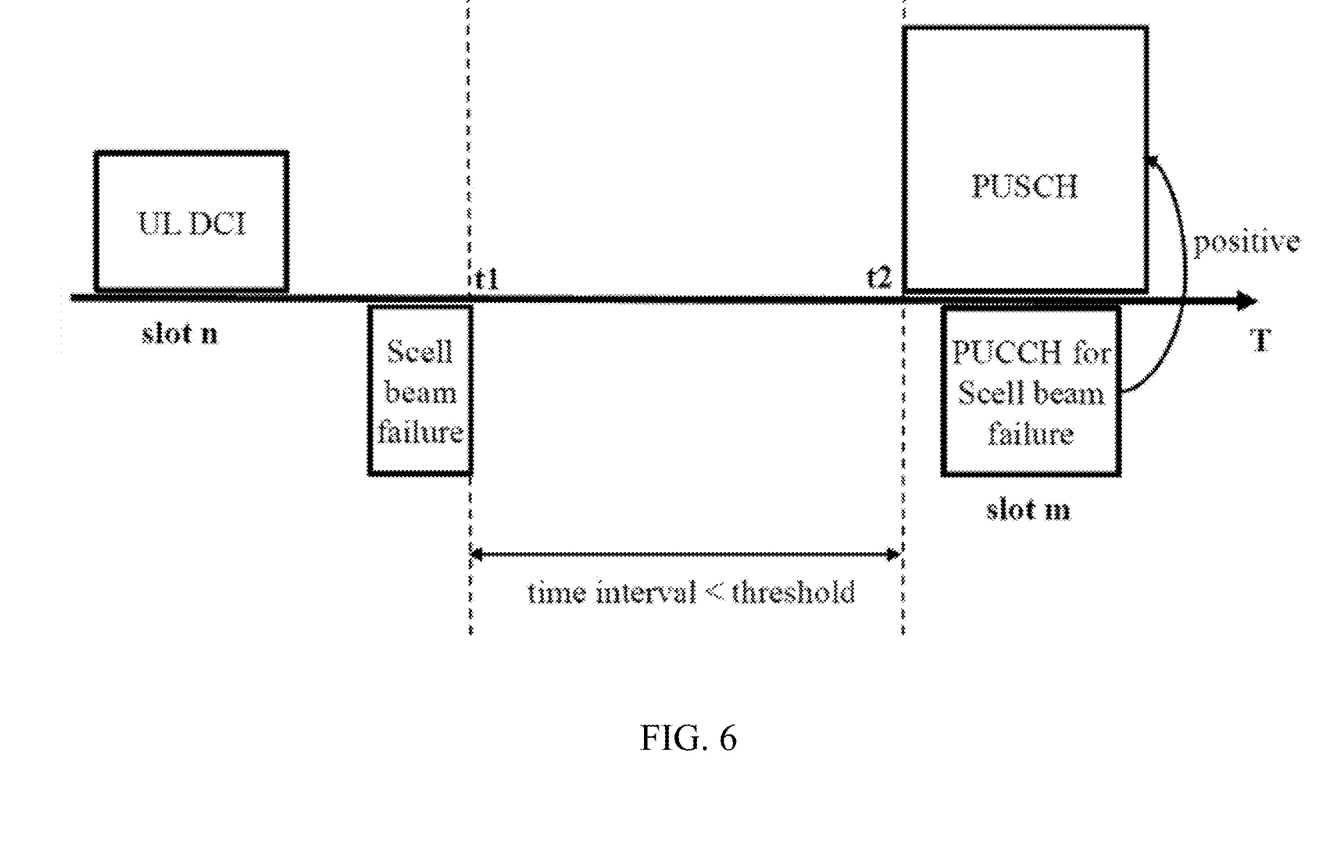
FIG. 6 illustrates an additional exemplary Scell BFRQ procedure in accordance with some embodiments of the present application.

FIG. 6 illustrates an additional exemplary Scell BFRQ procedure in accordance with some embodiments of the present application. Similar to FIGS. 3-5, the exemplary Scell BFRQ procedure as illustrated and shown in FIG. 6 is performed by a UE (e.g., a UE 101 as illustrated and shown in FIG. 1).

In the embodiments of FIG. 6, steps and operations performed by the UE are similar to those in FIG. 4. Similarities between the embodiments of FIGS. 4 and 6 include that UL DCI transmitted in slot n schedules a PUSCH transmitted in slot m for a UE, and a time interval between a detection of a S cell beam failure and a starting time of the PUSCH (i.e., "time interval" as illustrated and shown in FIG. 6) is less than the time threshold (i.e., "threshold" as illustrated and shown in FIG. 6), and thus, the UE cannot transmit or multiplex a Scell BFRQ MAC CE in the PUSCH in slot m, due to not satisfying a minimum time requirement of multiplexing the Scell BFRQ MAC CE in the PUSCH in slot m.

The differences between the embodiments of FIGS. 4 and 6 include that in the embodiments of FIG. 6, the PUSCH which is scheduled by UL DCI in slot n in time domain (i.e., "T" as illustrated and shown in FIG. 6) is transmitted in slot m, and a Scell BFRQ PUCCH is also transmitted in slot m. Besides, the Scell BFRQ PUCCH is overlapped with the PUSCH in time domain. In this aspect, the embodiments of FIG. 6 are similar to the embodiments of FIG. 5.

More specifically, in the embodiments of FIG. 6, if the UE detects a Scell beam failure in time point "t1", the UE will firstly determine whether the Scell BFRQ MAC CE can be transmitted in the PUSCH. Since the time interval between a detection of a Scell beam failure and a starting time of the PUSCH is less than the time threshold, the UE cannot transmit the Scell BFRQ MAC CE in the PUSCH as illustrated and shown in FIG. 6. Hence, the UE needs a UL resource to transmit the Scell BFRQ MAC CE. For example, as illustrated and shown in FIG. 6, the UE may transmit positive Scell BFRQ state information in the PUSCH to a BS (e.g., a BS 102 as illustrated and shown in FIG. 1), so as to indicate that a UL resource is required to transmit a Scell BFRQ MAC CE.

Details described in all the foregoing embodiments of the present application are applicable for the embodiments of FIGS. 3-6, (especially, how to notify a BS that at least one Scell requests a BFR, how to multiplex a Scell BFRQ state information with other UL transmission, and when a Scell BFRQ MAC CE can be transmitted on a PUSCH without a Scell BFRQ PUCCH as illustrated and described in the above).

For example, in the exemplary method 200 as illustrated and shown in FIG. 2, the UE further determines whether a PUCCH configured for transmitting Scell BFRQ state information associated with the detection of the Scell beam failure is overlapped with the first available PUSCH in time domain. In response to the PUCCH configured for transmitting the Scell BFRQ state information being overlapped with the first available PUSCH in time domain, the UE transmits the Scell BFRQ state information in the first available PUSCH. The UE may transmit the Scell BFRQ state information by rate matching the S cell BFRQ state information and data in the first available PUSCH. The UE may transmit the Scell BFRQ state information by puncturing the Scell BFRQ state information in the first available PUSCH.

In addition, in the exemplary method 200 as illustrated and shown in FIG. 2, the UE may transmit a negative S cell BFRQ in the first available PUSCH when the at least one failed CC index is transmitted in the first available PUSCH. Alternatively, the UE may transmit a positive Scell BFRQ in the first available PUSCH when the at least one failed CC index is not transmitted in the first available PUSCH. For instance, the Scell BFRQ state information transmitted by the UE has a higher priority than a scheduling request (SR).

Additionally, there is a case that a UE is configured to transmit K PUCCHs for respective K normal SRs excluding Scell BFRQ state information in a slot. For example, the UE transmits these K PUCCHs in ascending or descending order of values of a set of schedulingRequestResourceId. There is a possibility that a SR transmission is overlapped with a transmission of a PUCCH with HARQ-ACK information from the UE in the slot. There is another possibility that a SR transmission is overlapped with a transmission of a PUCCH with CSI report(s) from the UE in the slot. When the Scell BFRQ PUCCH is overlapped with the same transmission of the PUCCH with HARQ-ACK information or the Scell BFRQ PUCCH is overlapped with a transmission of a PUCCH with CSI report(s) from the UE in the slot, the normal SR and Scell BFRQ state information may be multiplexed with the HARQ-ACK information and/or CSI. Some exemplary embodiments are described in FIG. 7.

Figure 7:
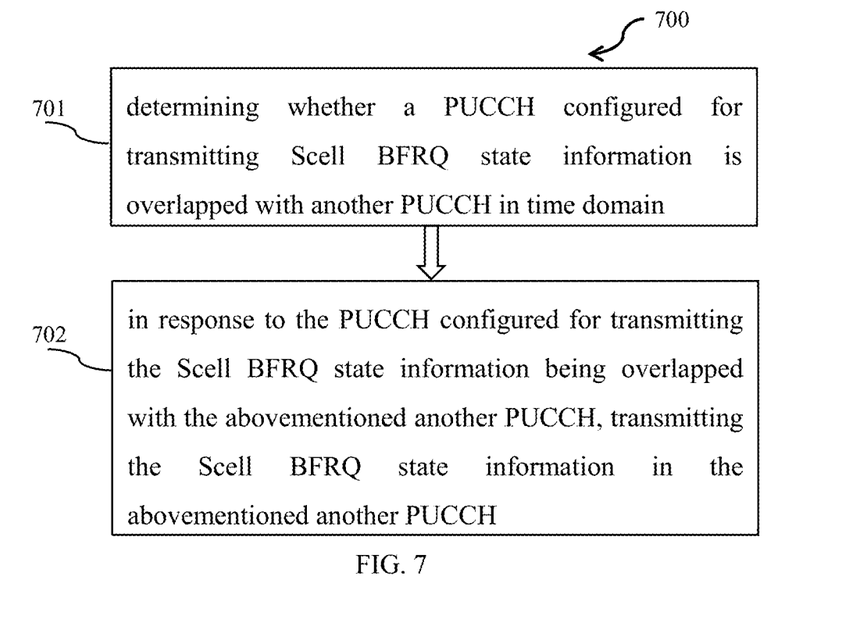
FIG. 7 illustrates another flow chart of a method for wireless communication in accordance with some embodiments of the present application.

FIG. 7 illustrates another flow chart of a method for wireless communication in accordance with some embodiments of the present application.

In the exemplary method 700 as illustrated and shown in FIG. 7, in step 701, a UE (e.g., a UE 101 as illustrated and shown in FIG. 1) determines whether a PUCCH configured for transmitting S cell BFRQ state information (i.e., a Scell BFRQ PUCCH) is overlapped with another PUCCH in time domain. In step 702, in response to the PUCCH configured for transmitting the Scell BFRQ state information being overlapped with the abovementioned another PUCCH, the UE transmits the Scell BFRQ state information in the abovementioned another PUCCH to a BS (e.g., a BS 102 as illustrated and shown in FIG. 1).

Details described in all the foregoing embodiments of the present application are applicable for the embodiments of FIG. 7, especially, the embodiments regarding Scell BFRQ state information as illustrated and described in the above.

In some embodiments of the present application, Scell BFRQ state information is similar to a SR, and Scell BFRQ state information has a higher priority than normal SR, and the abovementioned another PUCCH is for transmitting at least one of a hybrid automatic repeat request-acknowledge (HARQ-ACK) and Channel State Information (CSI). Thus, Scell BFRQ state information may be multiplexed in the PUCCH carrying HARQ-ACK and/or CSI.

For instance, the S cell BFRQ state information is represented by one or more bits, and a total number of the one or more bits is calculated by an equation of ceil(log 2(K+2)), wherein K represents the total number of PUCCHs configured for carrying SR overlapped with the abovementioned another PUCCH. Therefore, ceil(log 2(K+2)) bits may be multiplexed in the PUCCH carrying HARQ-ACK and/or CSI, and the state K+2 indicated by the ceil(log 2(K+2)) bits represents that there is a positive Scell BFRQ. Considering that Scell BFRQ state information has a higher priority than normal SR, the UE will transmit the state K+2, if there is positive S cell BFRQ no matter whether there is a normal positive SR.

In the exemplary method 700 as illustrated and shown in FIG. 7, the UE may determine a total number of PUCCHs configured for carrying SR overlapped with the abovementioned another PUCCH.

In some embodiments of the present application, the abovementioned another PUCCH may carry UCI with more than two bits. For example, the abovementioned another PUCCH for HARQ-ACK information or CSI report(s) is format 2, format 3 or format 4 as defined in TS 38.213. Given this, the one or more bits which are calculated by ceil($\log_2$(K+1)) may represent the corresponding SR, in ascending order of the values of schedulingRequestResourceId and may be multiplexed in the PUCCH carrying HARQ-ACK and/or CSI.

Details described in all the foregoing embodiments of the present application (for example, how to notify a BS that at least one Scell requests a BFR, how to multiplex a Scell BFRQ state information with other UL transmission, and when a BFRQ can be transmitted on a PUSCH without a S cell BFRQ PUCCH as illustrated and described in the above) are applicable for the embodiments as illustrated and shown in FIGS. 2-6.

Figure 8:
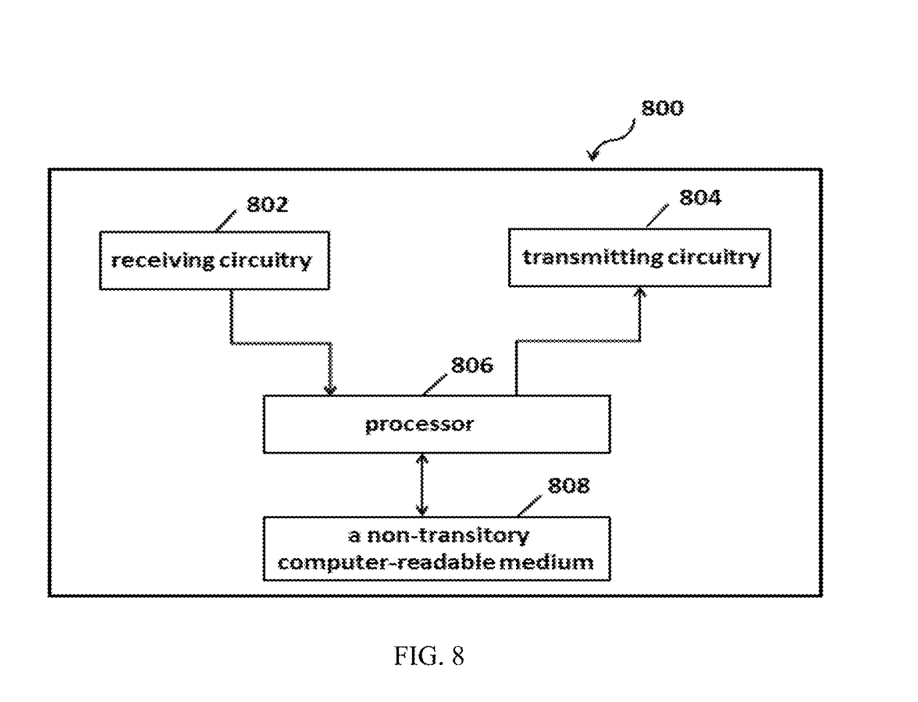
FIG. 8 illustrates a block diagram of an exemplary apparatus in accordance with some embodiments of the present application.

FIG. 8 illustrates a block diagram of an exemplary apparatus in accordance with some embodiments of the present application. Referring to FIG. 8, the apparatus 800 includes a receiving circuitry 802, a transmitting circuitry 804, a processor 806, and a non-transitory computer-readable medium 808. The processor 806 is coupled to the non-transitory computer-readable medium 808, the receiving circuitry 802, and the transmitting circuitry 804.

It is contemplated that some components are omitted in FIG. 8 for simplicity. In some embodiments, the receiving circuitry 802 and the transmitting circuitry 804 may be integrated into a single component (e.g., a transceiver).

In some embodiments, the non-transitory computer-readable medium 808 may have stored thereon computer-executable instructions to cause a processor to implement the operations with respect to UE(s) as described above. For example, upon execution of the computer-executable instructions stored in the non-transitory computer-readable medium 808, the processor 806 performs the method of FIG. 2, including: the processor 806 computes a time interval between a Scell beam failure and a first available PUSCH subsequent to the Scell beam failure, and based on a result of comparing between the time interval and a time threshold, the processor 806 determines whether to transmit at least one failed CC index associated with the Scell beam failure in the first available PUSCH.

In some embodiments, the non-transitory computer-readable medium 808 may have stored thereon computer-executable instructions to cause a processor to implement the operations with respect to BS(s) as described above. For example, upon execution of the computer-executable instructions stored in the non-transitory computer-readable medium 808, the processor 806 perform the method of FIG. 7, including: the processor 806 determines whether a PUCCH configured for transmitting Scell BFRQ state information is overlapped with another PUCCH in time domain, and in response to they are overlapped, the processor 806 transmits the Scell BFRQ state information in another PUCCH.

The method of the present application can be implemented on a programmed processor. However, the controllers, flowcharts, and modules may also be implemented on a general purpose or special purpose computer, a programmed microprocessor or microcontroller and peripheral integrated circuit elements, an integrated circuit, a hardware electronic or logic circuit such as a discrete element circuit, a programmable logic device, or the like. In general, any device on which there resides a finite state machine capable of implementing the flowcharts shown in the figures may be used to implement the processor functions of the present application.

Those having ordinary skills in the art would understand that the steps of a method described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. Additionally, in some aspects, the steps of a method may reside as one or any combination or set of codes and/or instructions on a non-transitory computer-readable medium, which may be incorporated into a computer program product.

While this disclosure has been described with specific embodiments thereof, it is evident that many alternatives, modifications, and variations may be apparent to those skilled in the art. For example, various components of the embodiments may be interchanged, added, or substituted in the other embodiments. Also, all the elements of each figure are not necessary for operation of the disclosed embodiments. For example, one of ordinary skill in the art of the disclosed embodiments would be enabled to make and use the teachings of the disclosure by simply employing the elements of the independent claims. Accordingly, embodiments of the disclosure as set forth herein are intended to be illustrative, not limiting. Various changes may be made without departing from the spirit and scope of the disclosure.

In this document, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that comprises the element. Also, the term "another" is defined as at least a second or more. The terms "including," "having," and the like, as used herein, are defined as "comprising."

What is claimed is:

1. A method performed by a user equipment (UE), the method comprising:
    detecting a secondary cell (Scell) beam failure;
    computing a time interval between the detection of the Scell beam failure and a first available physical uplink shared channel (PUSCH) subsequent to the detection of the Scell beam failure; and
    transmitting at least one failed component carrier (CC) index associated with the detection of the Scell beam failure in the first available PUSCH based at least in part on the time interval satisfying a time threshold, wherein the time threshold is based at least in part on a capability of the UE to transmit in the first available PUSCH.

2. The method of claim 1, further comprising:
    transmitting at least one available beam index corresponding to the at least one failed CC index in the first available PUSCH based at least in part on the time interval satisfying the time threshold.

3. The method of claim 1, wherein to satisfy the time threshold, the time interval is equal to or greater than the time threshold.

4. The method of claim 1, further comprising:
    canceling the transmitting the at least one failed CC index based at least in part on the time interval being less than the time threshold.

5. The method of claim 1, wherein the first available PUSCH is not a retransmission.

6. The method of claim 1, further comprising:
    determining a physical uplink control channel (PUCCH) configured for transmitting Scell beam failure recovery request (BFRQ) state information associated with the detection of the Scell beam failure overlaps with the first available PUSCH in time domain; and
    transmitting the Scell BFRQ state information in the first available PUSCH.

7. The method of claim 6, wherein:
    the Scell BFRQ state information includes a positive Scell BFRQ or a negative Scell BFRQ;
    the positive Scell BFRQ represents requesting an uplink resource to transmit the at least one failed CC index; and
    the negative Scell BFRQ represents not requesting the uplink resource to transmit the at least one failed CC index.

8. The method of claim 7, further comprising:
    transmitting the negative Scell BFRQ in the first available PUSCH when the at least one failed CC index is transmitted in the first available PUSCH; or
    transmitting the positive Scell BFRQ in the first available PUSCH when the at least one failed CC index is not transmitted in the first available PUSCH.

9. A user equipment (UE) for wireless communication, comprising:
    at least one memory; and
    at least one processor coupled with the at least one memory and configured to cause the UE to:
        detect a secondary cell (Scell) beam failure;
        compute a time interval between the detection of the Scell beam failure and a first available physical uplink shared channel (PUSCH) subsequent to the detection of the Scell beam failure; and
        transmit at least one failed component carrier (CC) index associated with the detection of the Scell beam failure in the first available PUSCH based at least in part on the time interval satisfying a time threshold, wherein the time threshold is based at least in part on a capability of the UE to transmit in the first available PUSCH.

10. The UE of claim 9, wherein the at least one processor is further configured to cause the UE to transmit at least one available beam index corresponding to the at least one failed CC index in the first available PUSCH based at least in part on the time interval satisfying the time threshold.

11. The UE of claim 9, wherein to satisfy the time threshold, the time interval is equal to or greater than the time threshold.

12. The UE of claim 9, wherein the at least one processor is further configured to cause the UE to cancel the transmitting the at least one failed CC index based at least in part on the time interval being less than the time threshold.

13. The UE of claim 9, wherein the at least one processor is further configured to cause the UE to:
    determine a physical uplink control channel (PUCCH) configured for transmitting Scell beam failure recovery request (BFRQ) state information associated with the detection of the Scell beam failure overlaps with the first available PUSCH in time domain; and
    transmit the Scell BFRQ state information in the first available PUSCH.

14. The UE of claim 13, wherein:
    the Scell BFRQ state information includes a positive Scell BFRQ or a negative Scell BFRQ;
    the positive Scell BFRQ represents requesting an uplink resource to transmit the at least one failed CC index; and
    the negative Scell BFRQ represents not requesting the uplink resource to transmit the at least one failed CC index.

15. The UE of claim 14, wherein the at least one processor is further configured to cause the UE to:
    transmit the negative Scell BFRQ in the first available PUSCH when the at least one failed CC index is transmitted in the first available PUSCH; or
    transmit the positive Scell BFRQ in the first available PUSCH when the at least one failed CC index is not transmitted in the first available PUSCH.

16. The UE of claim 9, wherein the first available PUSCH is not a retransmission.

17. A processor for wireless communication, comprising:
    at least one controller coupled with at least one memory and configured to cause the processor to:
        detect a secondary cell (Scell) beam failure;
        compute a time interval between the detection of the Scell beam failure and a first available physical uplink shared channel (PUSCH) subsequent to the detection of the Scell beam failure; and
        transmit at least one failed component carrier (CC) index associated with the detection of the Scell beam failure in the first available PUSCH based at least in part on the time interval satisfying a time threshold, wherein the time threshold is based at least in part on a capability of the processor to transmit in the first available PUSCH.

18. The processor of claim 17, wherein the at least one controller is further configured to cause the processor to:
    transmit at least one available beam index corresponding to the at least one failed CC index in the first available PUSCH based at least in part on the time interval satisfying the time threshold.

19. The processor of claim 17, wherein to satisfy the time threshold, the time interval is equal to or greater than the time threshold.

20. The processor of claim 17, wherein the at least one controller is further configured to cause the processor to:
  cancel the transmitting the at least one failed CC index based at least in part on the time interval being less than the time threshold.

* * * * *